United States Patent
Engle et al.

(10) Patent No.: US 7,140,477 B2
(45) Date of Patent: Nov. 28, 2006

(54) AUTOMATIC PARKING BRAKE FOR A RAIL VEHICLE

(75) Inventors: Thomas H. Engle, Clayton, NY (US); James E. Hart, Trafford, PA (US); Jason Connell, Bethel Park, PA (US); Joseph Pollono, Youngwood, PA (US); Andrew Marko, North Braddock, PA (US)

(73) Assignee: Wabtec Holding Corp., Wilmerding, PA (US)

(*) Notice: Subject to any disclaimer, the term of this patent is extended or adjusted under 35 U.S.C. 154(b) by 0 days.

(21) Appl. No.: 10/937,522

(22) Filed: Sep. 9, 2004

(65) Prior Publication Data

US 2005/0082126 A1   Apr. 21, 2005

Related U.S. Application Data

(60) Provisional application No. 60/501,383, filed on Sep. 9, 2003.

(51) Int. Cl.
*F16D 69/00* (2006.01)
*B61H 13/00* (2006.01)

(52) U.S. Cl. .................. 188/265; 188/67; 188/69; 188/33

(58) Field of Classification Search .............. 188/28, 188/31, 56, 60, 67, 68, 69, 265, 33, 46; 303/89; 292/299, 305, 256.6, 256.65, 256.69
See application file for complete search history.

(56) References Cited

U.S. PATENT DOCUMENTS

| | | | |
|---|---|---|---|
| 3,101,814 A | 8/1963 | Newell | |
| 3,223,458 A * | 12/1965 | Valentine | 303/6.01 |
| 3,595,347 A | 7/1971 | Billeter | |
| 3,731,766 A | 5/1973 | Campbell | |
| 3,757,908 A | 9/1973 | Fisher | |
| 3,780,837 A | 12/1973 | Haydu | |
| 3,907,078 A | 9/1975 | Means | |
| 4,007,815 A * | 2/1977 | Acre | 188/265 |
| 4,033,629 A | 7/1977 | Spalding | |
| 4,060,152 A | 11/1977 | Bogenschutz et al. | |
| 4,068,746 A | 1/1978 | Munechika | |
| 4,312,428 A | 1/1982 | Beacon | |
| 4,493,246 A | 1/1985 | Dalibout | |
| 4,613,016 A | 9/1986 | Hart et al. | |
| 4,662,485 A | 5/1987 | Kanjo et al. | |
| 4,733,602 A | 3/1988 | Smith et al. | |
| 4,746,171 A | 5/1988 | Engle | |
| 4,777,867 A * | 10/1988 | Severinsson et al. | 188/265 |
| 4,793,446 A | 12/1988 | Hart et al. | |
| 4,938,319 A * | 7/1990 | Ernst | 188/67 |
| 4,978,178 A | 12/1990 | Engle | |
| 5,361,876 A | 11/1994 | Haverick et al. | |
| 5,507,368 A | 4/1996 | Barefoot | |
| 5,558,412 A | 9/1996 | Kanjo et al. | |
| 5,634,536 A * | 6/1997 | Sturges | 188/265 |
| 5,738,416 A | 4/1998 | Kanjo et al. | |
| 5,848,550 A * | 12/1998 | Cathcart et al. | 188/265 |
| 6,027,180 A | 2/2000 | Greenaway et al. | |

(Continued)

Primary Examiner—Thomas Williams
(74) Attorney, Agent, or Firm—Buchanan Ingersoll & Rooney PC; Dennis M. Carleton

(57) ABSTRACT

A parking brake for a rail vehicle can automatically lock the rail vehicle brakes in an applied position, such as by clamping the brake cylinder push rod to prevent retraction from an applied position to a release position. An actuator can operate the parking brake, and a manual release can also be provided.

6 Claims, 11 Drawing Sheets

U.S. PATENT DOCUMENTS

| | | | |
|---|---|---|---|
| 6,044,934 A * | 4/2000 | Nemeth | 188/67 |
| 6,148,966 A | 11/2000 | Daugherty, Jr. et al. | |
| 6,176,639 B1 * | 1/2001 | Fratini et al. | 188/67 |
| 6,241,057 B1 | 6/2001 | Hiatt | |
| 6,253,886 B1 | 7/2001 | Brugait et al. | |
| 6,279,689 B1 | 8/2001 | Zemyan | |
| 6,305,504 B1 | 10/2001 | Ring | |
| 6,378,668 B1 | 4/2002 | Zemyan et al. | |
| 6,397,986 B1 | 6/2002 | Moore | |
| 6,443,507 B1 * | 9/2002 | Korvemaker | 292/256.6 |
| 6,491,141 B1 * | 12/2002 | Severinsson | 188/170 |
| 6,578,679 B1 | 6/2003 | Hill et al. | |
| 6,854,570 B1 * | 2/2005 | Connell | 188/33 |

* cited by examiner

AUTOMATIC PARKING BRAKE FOR A RAIL VEHICLE

CROSS-REFERENCE TO RELATED APPLICATIONS

This application claims priority to U.S. Provisional Patent Application Ser. No. 60/501,383, filed Sep. 9, 2003.

BACKGROUND

This invention relates generally to a parking brake for a rail vehicle braking system, and more particularly to a parking brake which can automatically lock the brakes on the rail vehicle in an applied position responsive to a brake application. The parking brake can be configured for use on both truck and car mounted rail car brake systems.

Freight car handbrakes provide two distinct functions, both important. One is to serve as a parking brake to prevent a car or cut of cars from moving when detached from a locomotive. The other is to serve as a manual speed-control brake on slow moving cars, as is often done with bulk commodity cars. While the conventional handbrake, as an individual car-based system, meets both sets of service requirements, this utility comes at a high cost. Both the normal use and the misuse of handbrakes generate substantial costs for railroads and/or car owners, in several different ways, including failure of a crewman to release a handbrake after normal use as a parking brake, mishaps during normal use as a parking brake, and time lost in waiting for a crewman to walk to, operate, and return from operation of the handbrake. The normal operational use of handbrakes on individual cars is both time consuming and labor intensive, and mishaps resulting from the task of setting and releasing handbrakes during such normal use accounts for a relatively high incidence of personal injury claims and lost time. Misuse, such as dragging cars with unreleased handbrakes is a pervasive, industry-wide problem that leads to inordinate numbers of wheelset changeouts and related equipment downtime. Additionally, trickle-down damage, such as from slid-flat wheels, create impacts on the rail and car that can damage equipment and lading, and increase both track and equipment maintenance costs.

The operation of a handbrake requires the presence of a trainman at that particular car; and the time for him to reach the car, operate the device, and move to another car or return is considerable. Later on, when the handbrake should be released, this time requirement is imposed a second time. Where remote-controlled locomotives are used, the entire switching operation must be held up until sufficient handbrakes are set to hold a car or group of cars. The tasks of setting up handbrakes every time cars are parked and then locating and releasing them when such cars are to be moved thus consumes substantial time and labor, which is a costly drain on railroad operations and productivity.

Parked cars must be secured, but the requirement that trainmen twice visit each car location in order to do so could be eliminated and the system effectiveness improved if a train-based system could be used rather than car-based equipment.

An automatic parking brake as described hereinafter could alleviate many of the problems and costs associated with handbrake use. Such a parking brake can be applied automatically, anytime cars are parked, and can also be released automatically when desired. Both the setup and release can be carried out without leaving the locomotive, and the holding power of the parking brake on any one car will be similar to that of the manual handbrake. Furthermore, and quite importantly, if empty cars are moved without releasing the parking brake, it will not normally result in any wheel sliding.

Accordingly, widespread implementation of such an automatic parking brake could eliminate a major portion of the problems and related costs associated with handbrake usage today, including wheel damage, secondary rail and equipment damage, time and labor requirements and injury claims. Moreover, in addition to resolving such existing problems as described previously, the automatic parking brake can also provide a measure of added safety for grade operations. For example, the automatic parking brake makes it easier to secure trains stopped on a grade and essentially provides a mechanical backup to the pneumatic emergency brake. Ultimately, each of these improvements in operating efficiency would directly impact train crew responsibilities and requirements.

A typical rail car hand brake system normally consists of an apparatus for manually applying and biasing one or more brake shoes against the tread of one or more wheels of the rail car by either turning a hand wheel or pumping a ratchet handle on a hand brake mechanism attached to the rail car. In both truck and car mounted rail car braking systems (illustrated in FIGS. 1–3), the hand brake mechanism is usually either a cast or stamped metal gear housing, and is typically attached to an outside end wall of the rail car. A rotatable chain drum must be rotated by turning the hand wheel to wind a brake chain onto the chain drum. The other end of the brake chain normally extends through the bottom of the gear housing and is interconnected with cable or other linkage, such as a hand brake lever, to the brake beams which carry the brake shoes. The winding of the brake chain onto the chain drum applies tension to the brake chain and brake linkage to draw the brake shoes against the tread surfaces of adjacent rail car wheels and, accordingly, applies the hand brake as intended.

A disadvantage of this prior art type hand brake arrangement is that train operators must manually apply the parking brake on each car to be left standing alone. When coupled groups of cars are to be left, it is up to the operator's judgment how many of the handbrakes must be set, and how hard the hand wheel must be turned to set them. This requires a considerable amount of time and labor. Additionally, the operators must be certain that the hand wheel is turned a sufficient amount to ensure that the parking brake is engaged. The possibility also exists that an operator may forget to apply the brake altogether on a rail car, which could result in unexpected movement of the rail car while parked at the siding or yard. Alternatively, wheel damage can result due to a failure to release the handbrake from the applied position before the car is to be moved. Operation of the hand wheel also requires exerting a considerable amount of physical force from a sometimes awkward position, which can make the hand brake difficult to apply. Injuries to operators also sometimes occur related to hand brake use, primarily due to slipping and tripping, but injuries due to overexertion have also been noted. Furthermore, since brake cylinder pressure can leak over time, a potentially hazardous condition can develop if a loss of brake cylinder pressure occurs subsequent to an emergency brake application, and particularly if the train is stopped on a grade.

A loaded brake engagement mechanism has been used in Type AB-8 and AB-10 Manual Empty and Load Freight Car Brake Equipments, manufactured By Westinghouse Airbrake Technologies, Inc., the assignee of the present invention. As described in *Instruction Pamphlet* 5062-2 Sup. 1, dated May 1942, this mechanism incorporated a telescoping housing, hollow rod and push rod arrangement inside a specially designed "UL" type brake cylinder, called a "load brake cylinder" which was used to make a loaded brake application. The load brake cylinder was one of two separate brake cylinders on the rail vehicle, the other being an "empty brake cylinder," which were used to control the application of brakes on the rail vehicle. The piston push rods of each brake cylinder were connected to a common lever, called the live cylinder lever, which was connected to the brake rigging on the rail car. In the load brake cylinder, the push rod telescoped within a hollow tube, and through a housing fastened to the end of the hollow rod the relationship between the hollow rod, & housing and the push rod was regulated by a ratcheting mechanism carried in the housing which cooperated with notches in the push rod and which carried a ratchet release trigger whose operation will be explained. During a loaded brake application, the empty brake cylinder would operate and, via the connection of the push rods of both the empty and load brake cylinders to the live brake cylinder lever, the push rod of the load brake cylinder would be pulled from the hollow rod as a result of force exerted on, and motion imparted to the push rod of the empty brake cylinder by its pressurization. The ratcheting mechanism was not operational in the release position of the load cylinder because in this position the release trigger was tripped. The load cylinder pushrod thus telescoped unimpeded out from the housing during the movement of the empty cylinder's piston and hollow rod. When, in the loaded car condition, the empty brake cylinder reached maximum extension of the push rod, the load brake cylinder could be pressurized through a special load sensing valve, which caused the load cylinder's hollow rod and housing to extend.

Extension of the housing containing the ratcheting mechanism would operate the ratchet trigger as soon as the housing moved away from the load cylinder body, and the now effective ratchet would prevent the push rod from returning to its telescoped position relative to the housing as the housing advanced under the influence of load cylinder pressurization. The push rod was thus caused to extend an additional amount along with the housing, thereby increasing the braking force. Basically, the telescoping function of the load cylinder push rod with respect to the housing, controlled via the ratcheting mechanism, permitted the application of additional piston force at a further distance from the pivot point of the live cylinder lever, without using an appreciable amount of air over and above that required for the empty cylinder, thus increasing the force delivered by this lever to the brake shoes at little price in air consumption as compared with an empty brake application.

When he brake was released, the ratchet mechanism, absent the release trigger, would have prevented the release of the shoes, because the load cylinder, even in release position, would have held its pushrod extended and thus held the live cylinder lever in its fully applied—empty car state.

This undesirable state of affairs was prevented by the operation of the ratchet release trigger operating as a result of the return of the hollow rod to its release position bringing the trigger back into contact with the cylinder's non-pressure head, tripping the ratchet release, and permitting the load cylinder pushrod to withdraw into the housing and hollow rod. This mechanism, however, was not a parking brake and could not address the disadvantages listed above.

A rail vehicle parking brake which is adapted to address such disadvantages of conventional rail vehicle parking brakes is described in co-pending U.S. patent application Ser. No. 10/438,141, assigned to the assignee of the present invention, the disclosure of which is hereby incorporated herein by reference.

Further embodiments of a parking brake for a rail vehicle which can be applied automatically to lock the brakes on the rail vehicle are disclosed hereinafter.

SUMMARY

According to the invention, a parking brake for a rail vehicle, such as a freight car, is provided which can lock the rail vehicle brakes in an applied position automatically, for example in response to an emergency brake application, to prevent an unwanted release of the rail vehicle brakes as might otherwise occur over time as a result of normal air leakage or equipment defects. The parking brake can accomplish this by preventing the brake cylinder piston push rod from moving from an applied position to a released position. The parking brake can selectively be placed in an activated or deactivated mode. The parking brake can be activated automatically immediately after movement of the piston push rod to apply brakes on the vehicle. Subsequent to such a brake application, the parking brake can prevent retraction of the push rod even if there is a loss of brake cylinder pressure. Release of the parking brake can also be implemented automatically, for example responsive to restoration of brake pipe pressure, or manually at each car via provision of a manual release rod similar to or combined with the brake cylinder release rod of existing AAR standard freight car brake equipment.

In one embodiment of the parking brake, a split ring clamp assembly can be activated to grip the push rod subsequent to a brake application. The split ring clamp can encircle the piston Hollow rod and its contained push rod and can be closed against the hollow rod to block retraction of both it and its enclosed push rod. The clamp ring can likewise be opened to release the piston hollow rod to permit the brakes to be released when desired. An actuator can be provided to operate the clamp ring assembly, and a manual release handle can also be provided. The actuator can selectively control the clamp ring assembly to engage the push rod only under certain circumstances, such as, for example, immediately after an emergency brake application.

In another embodiment of the parking brake the blocking device can employ a collet type clamp assembly associated with the push rod. The collet can have self-activating jaws which permit extension of the piston hollow rod to apply the brakes, but automatically grip the hollow rod upon movement of the hollow rod in an opposite direction to release the brakes. An actuator can be provided to control the collet clamp assembly, and a manual release handle can also be provided.

A further embodiment of the parking brake can employ a blocking device having a bar with one end connectable the brake rigging and another end slidably received through a guide portion. The guide portion can be fixed, and a locking portion can be provided which cooperates with the guide portion and the end of the bar which is slidably received through the guide portion. The locking portion can permit sliding movement between the bar and the guide portion in one direction to apply the brakes, but can automatically engage the bar to block sliding movement between the bar and the guide portion if the bar begins to move in the opposite direction, thereby preventing the brakes from being released until the locking portion releases engagement with the bar. The locking portion can be a ratcheting member and the bar can be provided with notches engaged by the ratcheting member. The locking portion can be designed to be used external of the brake cylinder, wherein the bar and guide portion cooperate to block retraction of the brake rigging, or internally of the brake cylinder, wherein the bar and guide portion cooperate to block retraction of the piston push rod or hollow rod.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
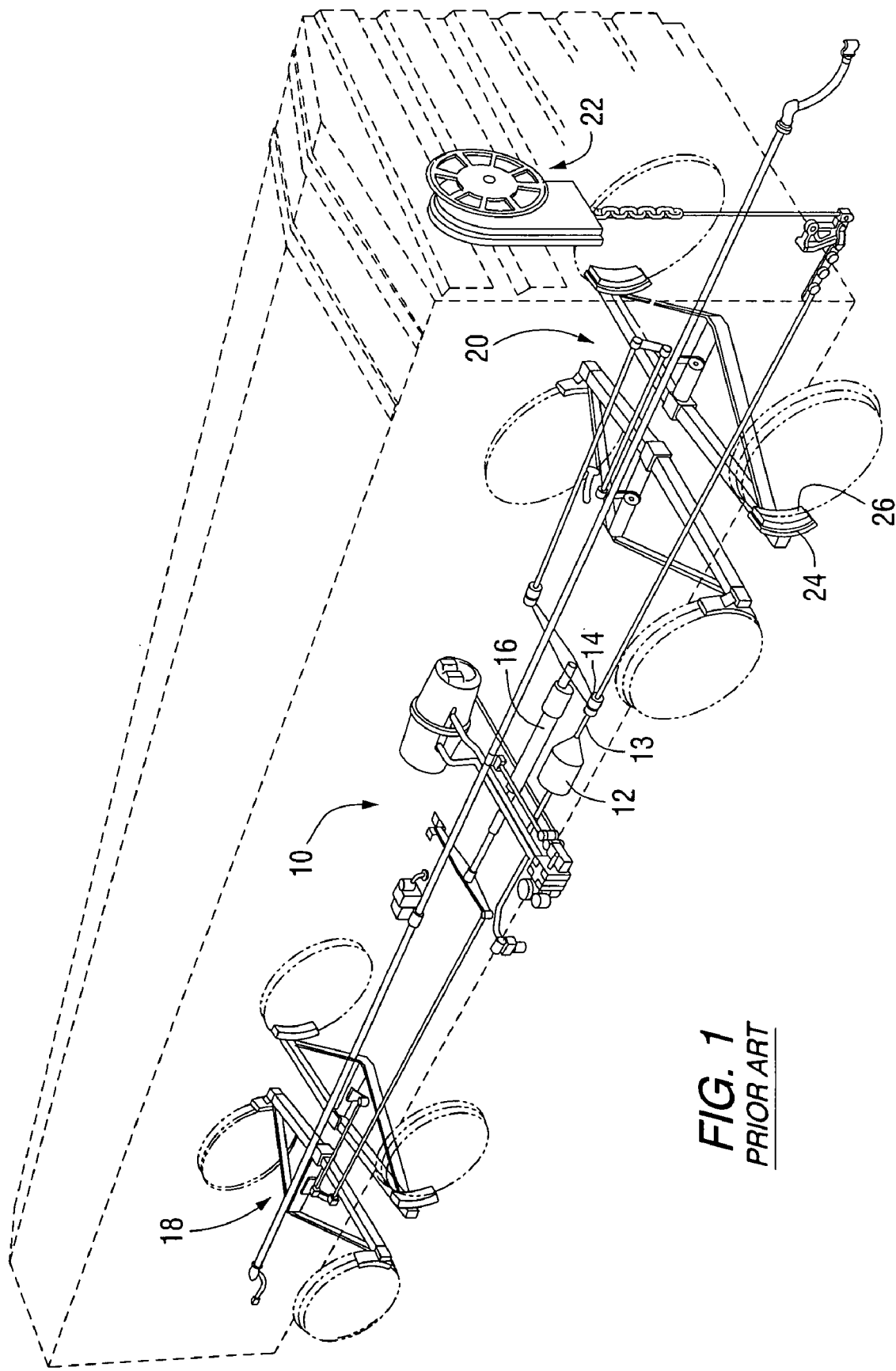
FIG. 1 is a plan view of a prior art type car-mounted brake system having a conventional prior art hand wheel hand brake or parking brake.
Figure 2:
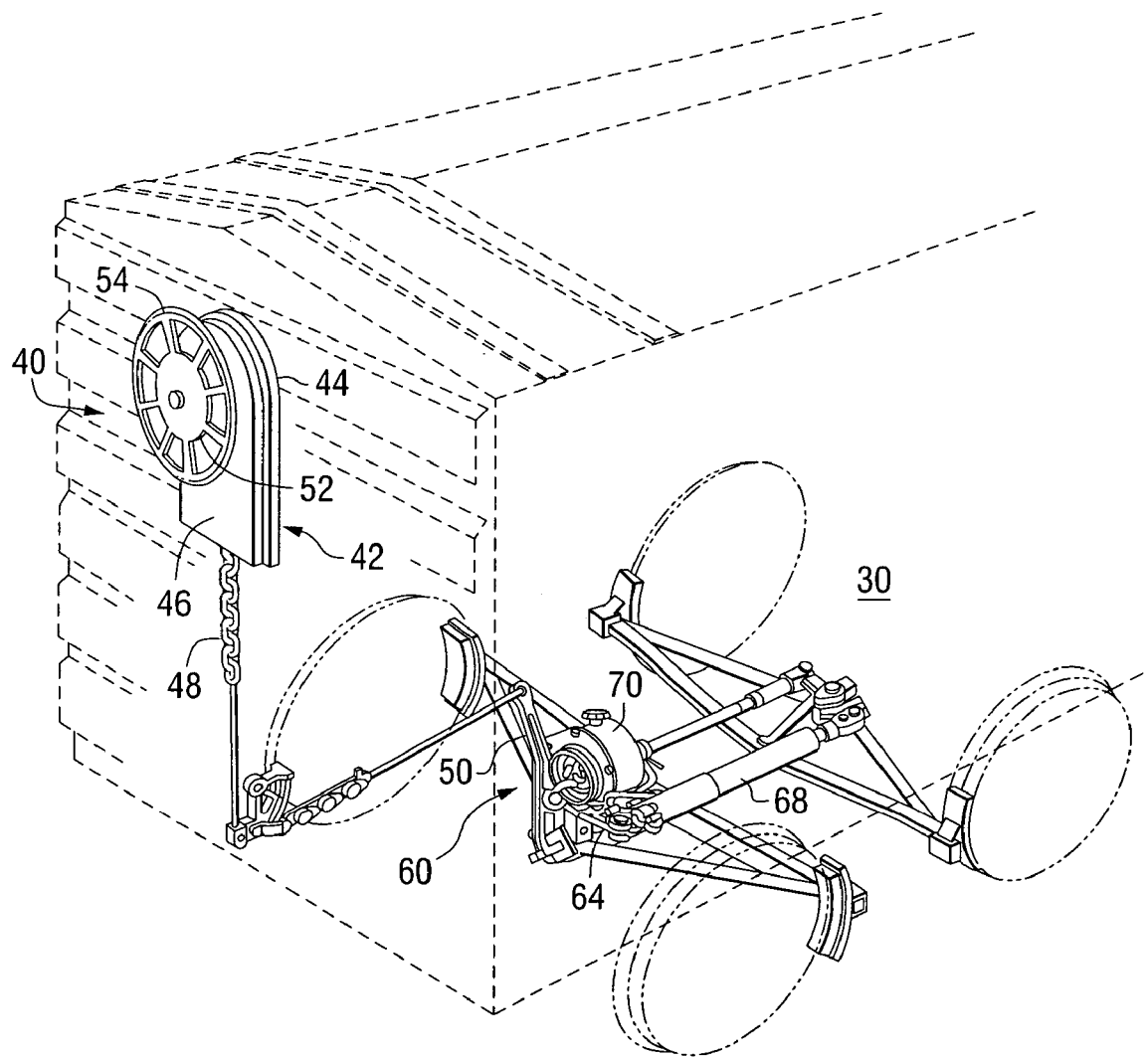
FIG. 2 is a plan view of a prior art type truck-mounted brake system having a conventional prior art hand wheel hand brake or parking brake.
Figure 3:
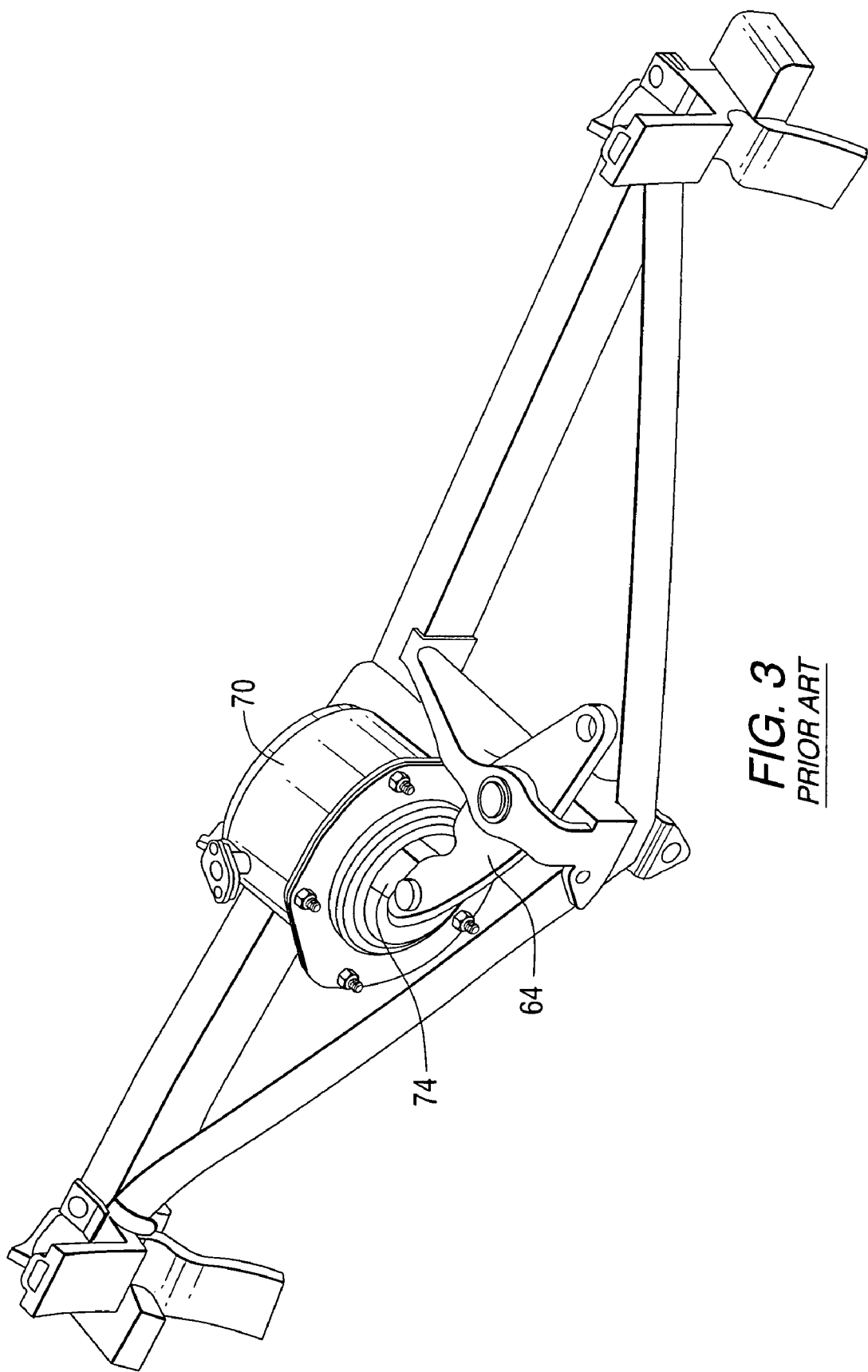
FIG. 3 is an enlarged view of a portion of the truck-mounted brake system shown in FIG. 2, showing more details of the brake cylinder.

Referring now to the drawing figures wherein like reference numbers refer to similar parts throughout the several views, prior art rail vehicle braking systems are shown in FIGS. 1–3, which illustrate both car and truck mounted braking systems, respectively.

FIG. 1 shows a prior art car mounted brake assembly, generally designated 10, for a rail vehicle. The car mounted brake assembly 10 includes a brake cylinder 12 having a piston push rod 13 connected to a cylinder force transfer lever 14. A slack adjuster 16 is also shown associated with the cylinder force transfer lever 14, and a pair of brake beams 18 and 20 are mounted at each end of the car mounted brake assembly 10. A hand brake or parking brake 22, is also provided which is associated with the cylinder force transfer lever 14. The brake beams 18, 20 are actuated by the brake cylinder 12 or the hand brake 22, via the cylinder force transfer lever 14 and a series of additional levers and linkages. Brake levers are used throughout the braking system to transmit, increase, or decrease braking force, as well as to transfer or change direction of force. Thus, during a braking situation wherein a force is applied by the brake cylinder 12 or the hand brake 22, these levers and rods transmit and deliver braking forces to the brake beams 18 and 20 and, consequently, to the brake heads 24 and brake shoes 26 mounted thereon.

Referring to FIGS. 2 and 3, a prior art truck mounted brake system 30 is shown. The hand brake mechanism 40 has a housing 42 including a back wall 44 mountable on a rail car and a cover 46. The cover 46 is secured to the back wall 44. A chain 48 for application or release of the brakes is connected, as is conventional, to the brake rigging via a hand brake lever 50, and is attached to and wound on a winding drum 52. The hand brake lever 50 is, in turn, connected to cylinder force transfer lever 64. In order to apply the brakes, a hand wheel 54 is rotated in a clockwise direction to wind the chain 48 about the winding drum 52 and to cause the hand brake lever 50 to be pulled in an outward direction away from the brake rigging, generally designated 60. This causes the cylinder force transfer lever 64 to be rotated in a counterclockwise direction resulting in the piston push rod 74, shown in FIG. 3, being pulled in an outward direction and the required force being applied to the slack adjuster assembly 68. This force is similar to the force which is applied by the brake cylinder piston rod, not shown, of the air cylinder assembly 70 when such is pressurized.

Figure 4:
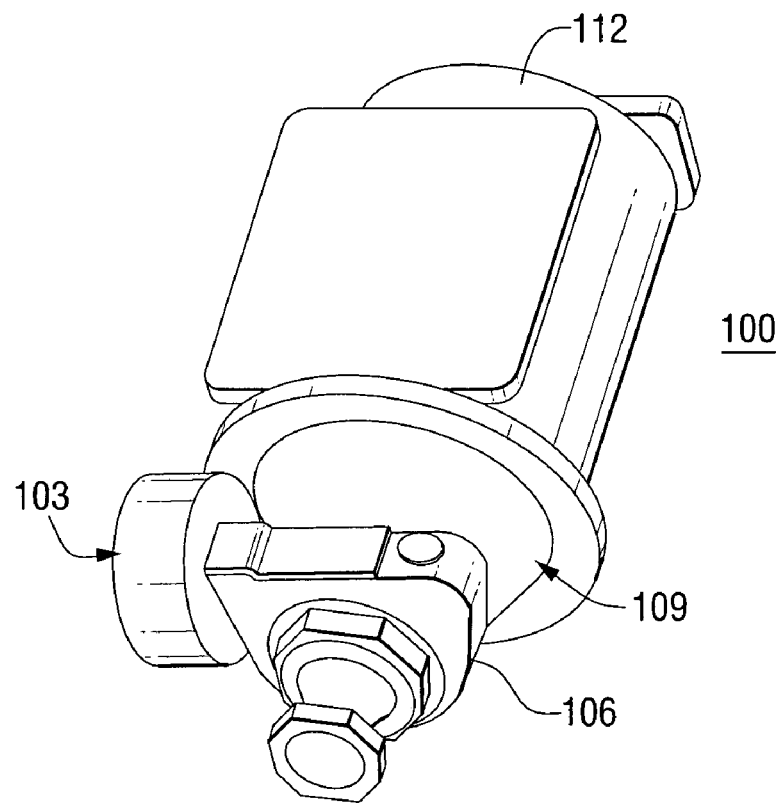
FIG. 4 is a perspective view of an embodiment of an automatic parking brake according to the invention.
Figure 5:
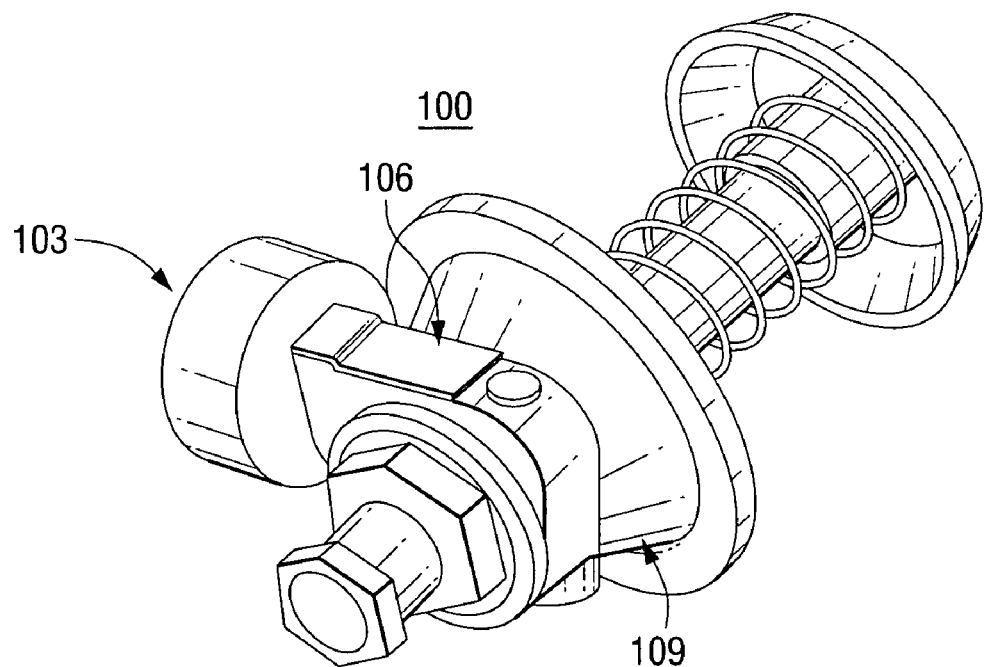
FIG. 5 is a perspective view of a portion of the automatic parking brake shown in FIG. 4.
Figure 6:
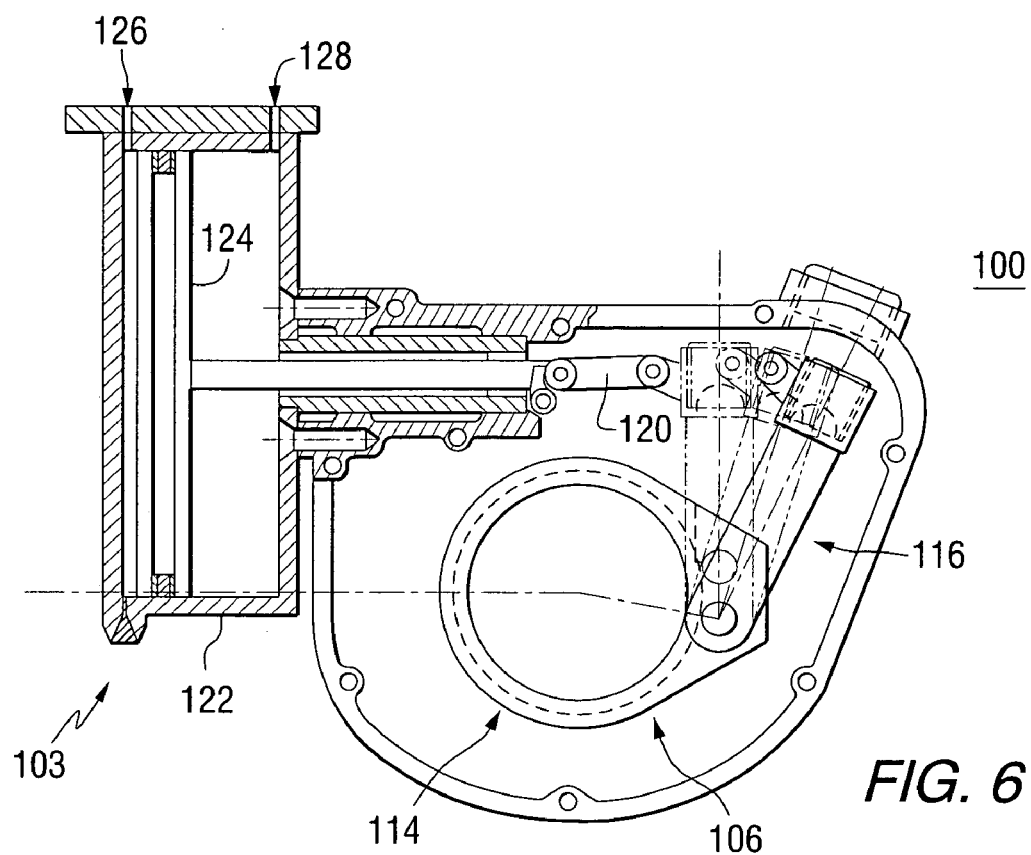
FIG. 6 is a cross-section view of an embodiment of a clamp portion of an automatic parking brake according to the invention.
Figure 7:
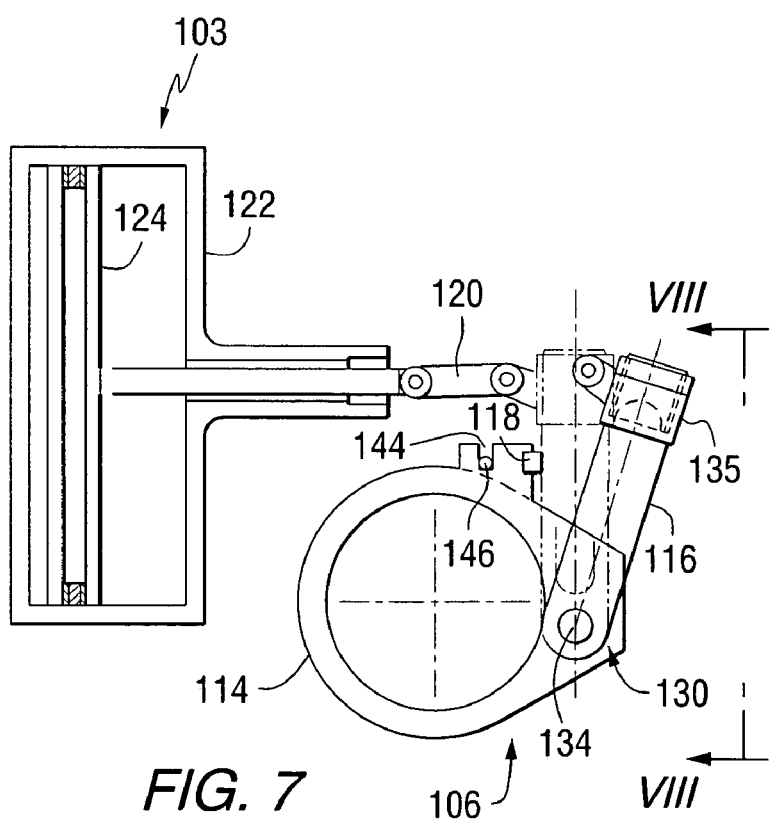
FIG. 7 is a cross-section view of an embodiment of a clamp portion similar to the clamp portion shown in FIG. 6.
Figure 8:
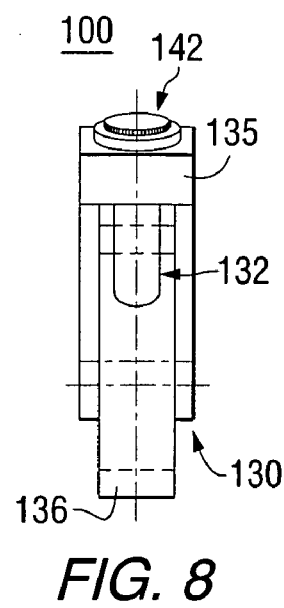
FIG. 8 is a view taken along line VIII—VIII in FIG. 7.

Referring now to FIGS. 4 and 5, an embodiment of an automatic parking brake 100 according to the invention is shown having a parking brake actuator 103 and clamp assembly 106 built into a non-pressure head 109 of a conventional rail vehicle brake cylinder 112. The parking brake 100 employs a specific geometry designed to fit in the minimum space available on the non-pressure head 109 of, for example, a conventional Westinghouse Air Brake Company U-Type brake cylinder 112.

Unlike a handbrake, the automatic parking brake 100 need not generate high braking forces through a long travel. Instead, the car-holding function can be achieved simply by retaining braking force that is generated pneumatically. Other than links to the manual release lever and status indicators, the entire unitized automatic parking brake 100 can be carried on a modified non-pressure head 109 fitted to a standard brake cylinder 112, as shown best in FIG. 5. The automatic parking brake 100 does not alter the normal cylinder lever position or travel.

The unitized design, i.e., incorporating the piston and pre-caged spring, facilitates a relatively simple installation for both new rail vehicles and for retrofitting the existing brake systems on rail vehicles already in service. Since the piston and pre-caged spring are already included with the new unitized parking brake 100, retrofitting is very convenient. All that need be done is replace the existing, conventional non-pressure head assembly, including the piston and pre-caged spring, with the new unitized design which has the parking brake actuator and clamp assembly incorporated with a new piston and pre-caged spring. Truck-mounted brakes require a similar retrofit on each truck, on each of the two brake cylinders.

As shown more clearly in FIGS. 6 through 11, the automatic parking brake 100 can include a split ring clamp 114 which encircles the piston push rod (not shown), wherein the clamp ring assembly 106 can be operated using an over-center lever arrangement 116 which is activated via the parking brake actuator. The clamp ring 114 assembly is easily adjustable, and all high clamping forces are reacted out in the clamp ring 114, while application forces are kept around 850 pounds, which is easily handled by the existing structure. The clamp ring 114 will lock in the clamped position when the lever arrangement 116 is pulled "over center." The travel of the over-center lever arrangement 116 can be limited by a stop member 118, which can be part of, or mounted on, the clamp ring 114. A loss of clamping stroke associated with locking the clamp ring 114 can be minimized by making the stop member 118 adjustable.

The parking brake actuator 103 can be, for example, a small pneumatic actuator, and can control the split ring clamp 114 via a linkage 120 connecting over-center lever arrangement 116 to the actuator 103. In the open position, clearance between the clamp ring 114 and the brake cylinder push rod permits the push rod to slide freely through the clamp 114, such as during a brake application. However, the pneumatic actuator 103 can close the clamp ring 114 tightly around the push rod, to hold the push rod securely in the applied position with no back-slip. Once clamped, the parking brake 100, via the clamp ring 114, will mechanically retain the applied brake force, much like a ratcheted conventional handbrake. Tests have shown that the clamp ring 114 can retain approximately 90% of the emergency brake shoe force indefinitely, even if the brake cylinder pressure is completely exhausted.

In the embodiment shown, the brake actuator 103 can be a relatively small, short-travel pneumatic cylinder 122 with a double-acting piston 124, an end of which is connected to the actuating linkage 120. The position of the piston 124 can be controlled pneumatically via a brake pipe port 126 communicating on the face of the piston 124 and a brake cylinder port 128 communicating on the back of the piston 124. However, it will be understood to one of ordinary skill in the art that other types of actuators could be employed, such as, for example, an electrically operated brake actuator.

As illustrated best in FIGS. 7–9B, the over-center lever arrangement 116 can include two members 130, 132 of unequal lengths which are connected to opposing ends of the split ring clamp 114. The split ring clamp 114 is closed, i.e., the ends are drawn together, when the two unequal length members 130, 132 are rotated (in this example—counterclockwise) about a point 134 where the longer member 130 is connected to the split ring clamp 114. To open the split ring clamp 114, the two unequal length members 130, 132 are rotated in the opposite direction, i.e., clockwise.

The longer member 130 is referred hereinafter to as the tension member, whereas the shorter member 132 is referred to as the compression member. The tension member 130 is shown best in FIGS. 7 and 8, and can include two spaced apart, generally parallel plates connected at the top by a bracket 135. At the bottom the spaced apart plates are rotatably connected, e.g., pinned, to a mounting portion 136 on the lower end of the split ring clamp 114. The mounting portion 136 can be a projection which fits between the parallel plates of the tension member 130 and is rotatably connected thereto via a pin inserted through coaxial mounting holes through both parallel plates and the projection. At the top end of the tension member 130, the bracket 135 is pinned to the actuating linkage 120, which is connected to the rod end of the double acting piston 124 of the short travel pneumatic cylinder 103.

Figure 9A:
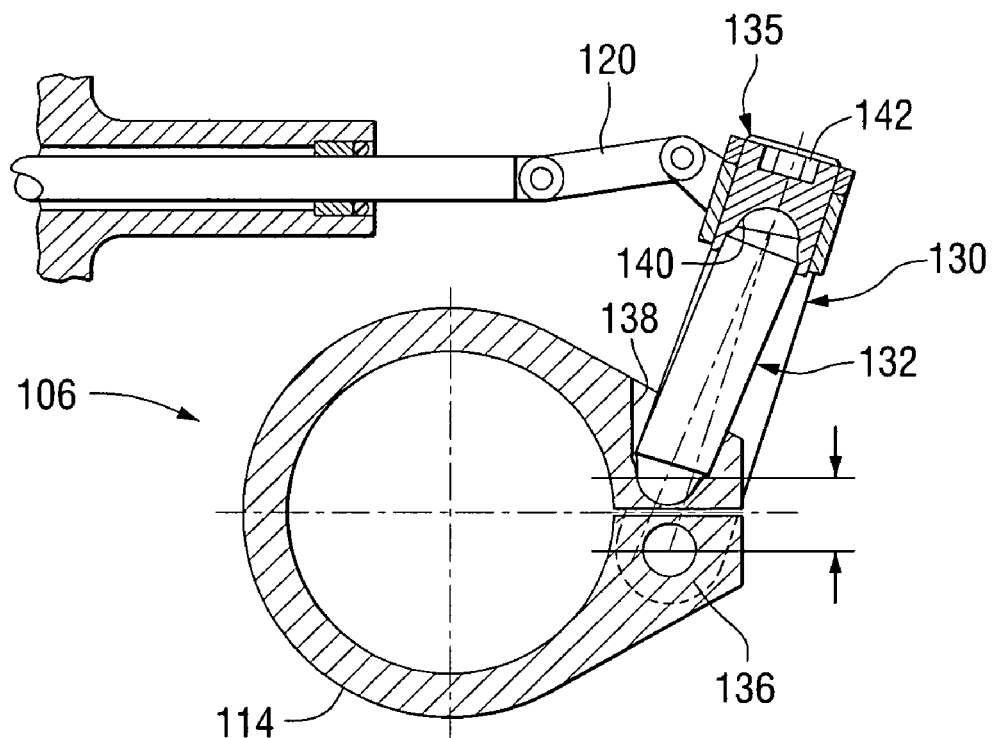
FIG. 9A is a section view of an embodiment of a clamp portion, similar to the clamp portion in FIG. 7, shown in an open position.
Figure 9B:
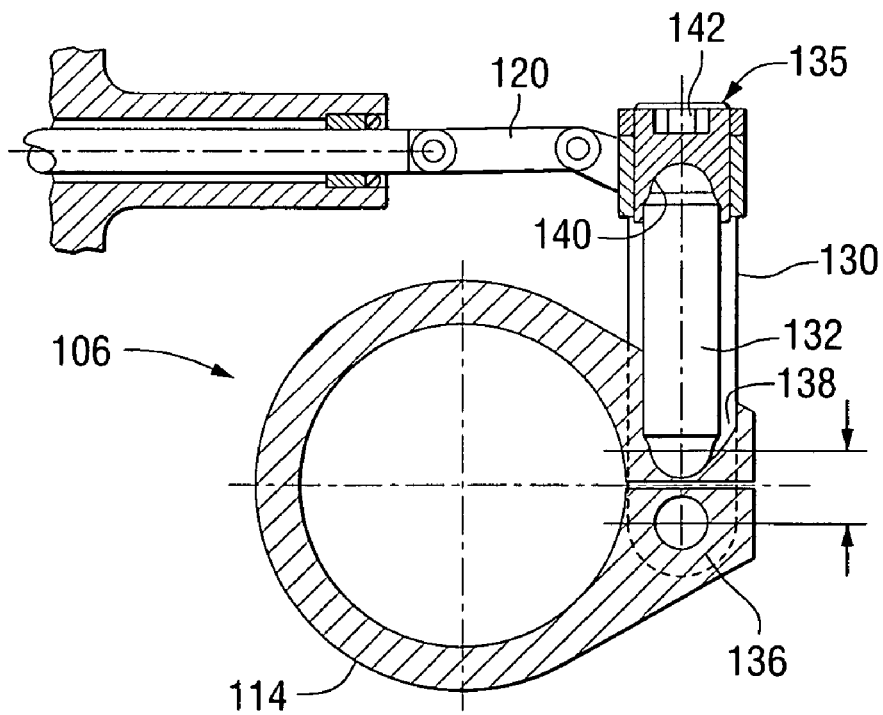
FIG. 9B is a section view of the clamp portion in FIG. 9A, shown in a closed position.

Referring particularly to FIGS. 9A and 9B, the compression member 132 can be located between the parallel plates of the tension member 130. The compression member 132 can be a column with rounded ends, captured between the upper end of the split ring clamp 114 and the bracket 135 at the upper end of the tension member 130. The lower end of the compression member 132 is supported in a pocket 138 formed in the upper end of the split ring clamp 114, and the opposite, upper end, of the compression member 132 is similarly supported by a pocket 140 in the bracket 135. The pocket 138 in the upper end of the clamp ring 114 can be machined with a spherical bottom, and appropriately sized and shaped to permit the compression member 132 to freely pivot about the radius in the fore and aft direction. This permits a sufficient degree of angular mobility for the compression member 132 to move when the parking brake actuator 103 moves the tension member 130. FIG. 9A shows the split ring clamp 114 in the open position, whereas FIG. 9B shows the split ring clamp 114 in the closed position.

Additionally, a clamp force adjustment member 142 can also be provided, wherein the pocket 140, in which the top of the compression member 132 is positioned, can be machined into the end of a threaded adjusting screw. The thread adjusting screw can be received in the top of the bracket 135 on the tension member 130. A threaded locknut on the outer end of the thread adjusting screw can also be provided to assure a secure lock once adjustment has been made at initial setup. The clamp force adjustment member 142 can be used to adjust the difference in the (unequal) length of the compression 132 and tension 130 members. Adjusting this difference varies the clamping force on the push rod.

In the embodiment shown, counter-clockwise rotation of the tension member 130, and thus the unequal length compression member 132 carried thereby, will draw the upper and lower ends of split ring clamp 114 together, up to the point where the center lines of the tension 130 and compression 132 members are collinear (after which the ends of the split ring clamp 114 would begin to move apart). The adjustable over-travel stop member 118 can be provided, such as on the split ring clamp 114 in a location cooperable with the tension member 130, to prevent the tension member 130 from rotating past the collinear point by more than a few thousandths of an inch. Rotation in the opposite, i.e., clockwise, direction will re-open the clamp 114 and permit the push rod to retract and release the brakes.

Additionally, a slot 144 can be provided on the outer surface of the split ring clamp 114 to receive an anti-rotation pin 146. The anti-rotation pin 146 prevents tension member 130 from rotating past center more than a few thousandths of an inch. A portion on the split ring clamp 114, such as a lug, can be machined to accommodate both the anti-rotation pin 146 and the over-center, i.e., over-travel, stop 118 for the tension member 130 in the locked (vertical) position. The tension member 130 can be, for example, forged from 4140 steel or equal, and should more spring be required at this point, the parallel plate portions could be formed slightly bowed.

The design of the pneumatic actuating cylinder 103 was chosen to provide sufficient force to apply the lock with 30 psi brake cylinder pressure. This can be done because, if cars are to be switched with air, there may be times when trains will move without a full charge and, for example, if a transfer string which would in present practice be moved with no air connected, management and crew alike might be inclined to leave the yard as soon as possible. Thus, if there was enough air showing on the cab gage to indicate that the trainline was intact, the engineman might move the train prematurely. In such cases, an emergency application might not produce full brake cylinder pressure on all cars, and this is thus taken into account in the design for sufficient force with only 30 psi available brake cylinder pressure.

The double acting piston 124 can further include a rod seal (not shown). The two types of seals shown on the actuator are examples of two alternative seals which could be used.

Figure 10:
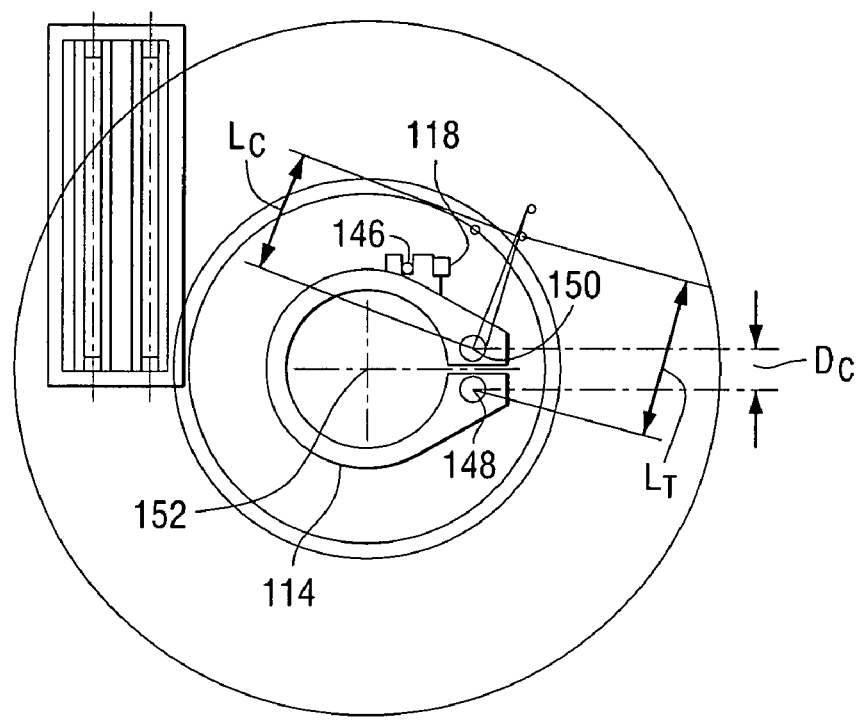
FIG. 10 is a diagram illustrating geometry representative of a clamp portion of an automatic parking brake according to the invention.

Referring now to FIG. 10, the critical lengths of the members as well as their layout and pivot centers opposite the edges of the split are shown in the enlarged diagrammatic front view. Some example dimensions for a presently preferred embodiment can include a 2.26 inch compression member ($L_C$) cooperating with a 2.93 inch tension member ($L_T$). The distance ($D_1$) between the clamp centers 148, 150, i.e., where the compression $L_C$ and tension $L_T$ members, respectively, attach to the opposing end of the split ring clamp 114 can be about 0.69 inch when the clamp 114 is in the closed position. The centerline of each of the clamp end centers 148, 150 is generally aligned in this (closed) position, and are about 1.87 inches ($D_2$) offset from the center 152 of the clamp ring 114.

Figure 11:
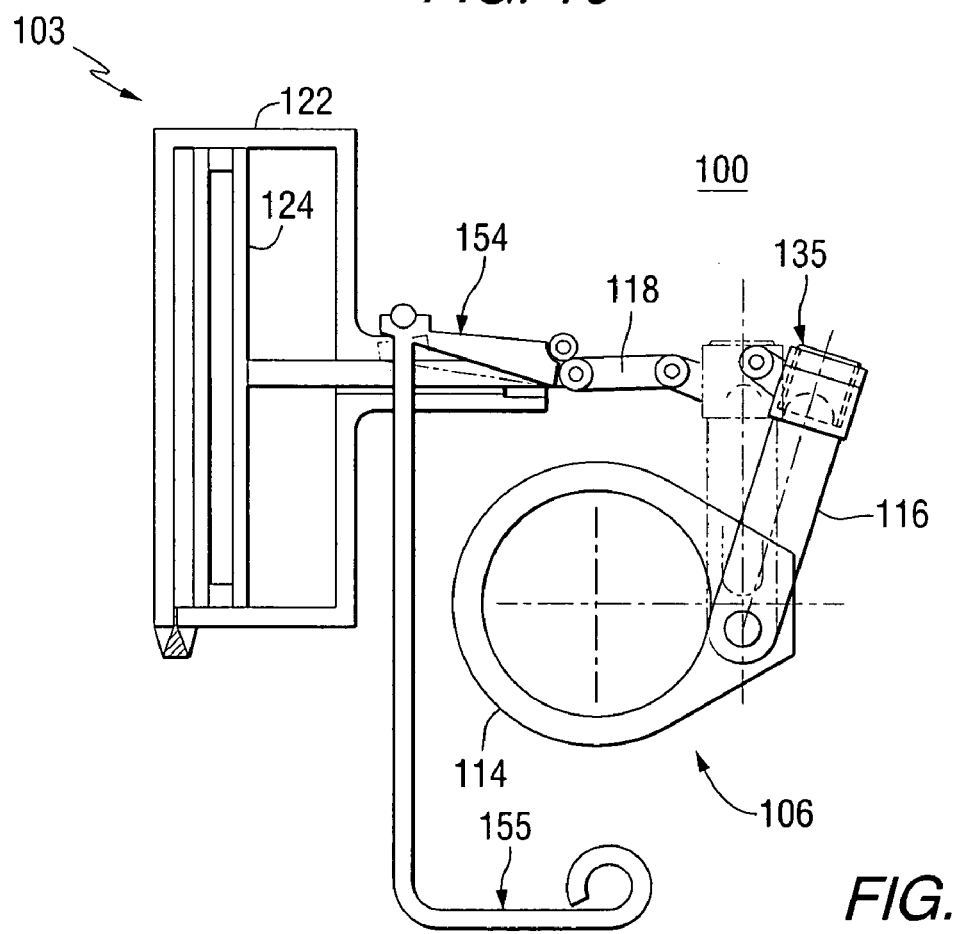
FIG. 11 is a section view of an embodiment of a clamp portion, similar to the clamp portion shown in FIG. 7, and including a manual release member.

As shown in FIG. 11, the automatic parking brake can also include a manual latch release lever 155. The manual release lever can be an elongated rod having a handle at one end and an opposite end connected to a manual latch release mechanism 157 on the parking brake actuator 103. When the parking brake is activated, i.e., holding the push rod in an applied position, the brake release lever 155 can be manually operated to trip the latch release mechanism 157. The latch release mechanism 157 is designed, when tripped, to force the lever arrangement 116 back over center, thereby opening the clamp ring 114 and releasing the push rod.

The manual release lever 155 could also be interlocked in some manner with an existing the brake cylinder release valve. In this case, if the brake cylinder release valve handle were pulled, the latch release mechanism 157 would also be tripped, resulting in opening the clamp ring 114 and releasing the push rod to restore normal service capability to the brake cylinder. Conversely, if the manual release lever 155 were pulled, it would also activate the brake cylinder release valve, which would both drain the brake cylinder and release the automatic parking brake 100.

The manual release lever 155 can be provided for use where release without air is necessary or desired. The handle of the manual release lever 155 can be made accessible from either side of the car. The manual release lever 155 can require only a momentary pull on the handle with relatively little force, which can be accomplished by a person standing on the ground next to the rail vehicle. The required force is similar to the pull required on the present brake cylinder quick release valve.

The parking brake 100 could also be provided with a brake on/off indicator (not shown), which can be positioned such that it is readily visible from either side of the rail vehicle.

Force calculation data indicates that if the tension member 130 is allowed to pass over dead center by 0.020 inch, the end will be held against a stop on the actuator piston push rod (possibly located in the cylinder head for ease of adjustment) by a force of approximately 30 pounds. The manual latch release lever 155 shown can have about a five to one ratio. Thus, a six pound pull on the manual latch release lever 155 can trip the mechanism 157, releasing the parking brake, while maintaining basic simplicity.

A provision for manual release of the parking brake 100 can be required because of the necessity to switch cars without air. In order to do this when an emergency air brake application is in effect, a train operator must walk the train pulling release rods on each car to be switched. If an emergency application, which usually made when the road engine is cut off, is to set the locking devices on all of the cars, the locking devices should also be releasable at the same time and with the same effort as the air brake application that set them. Ideally, the manual release lever 155 would be located either next to, or tied in with, the conventional release valve handle. When the manual release lever 155 is pulled, it could be designed to effect both a release of the clamp 114, or other mechanical blocking device as may be described hereinafter, and reset any air controls used to operate the blocking device so as to avoid the possibility of stuck brakes and attendant wheel damage.

Figure 12:
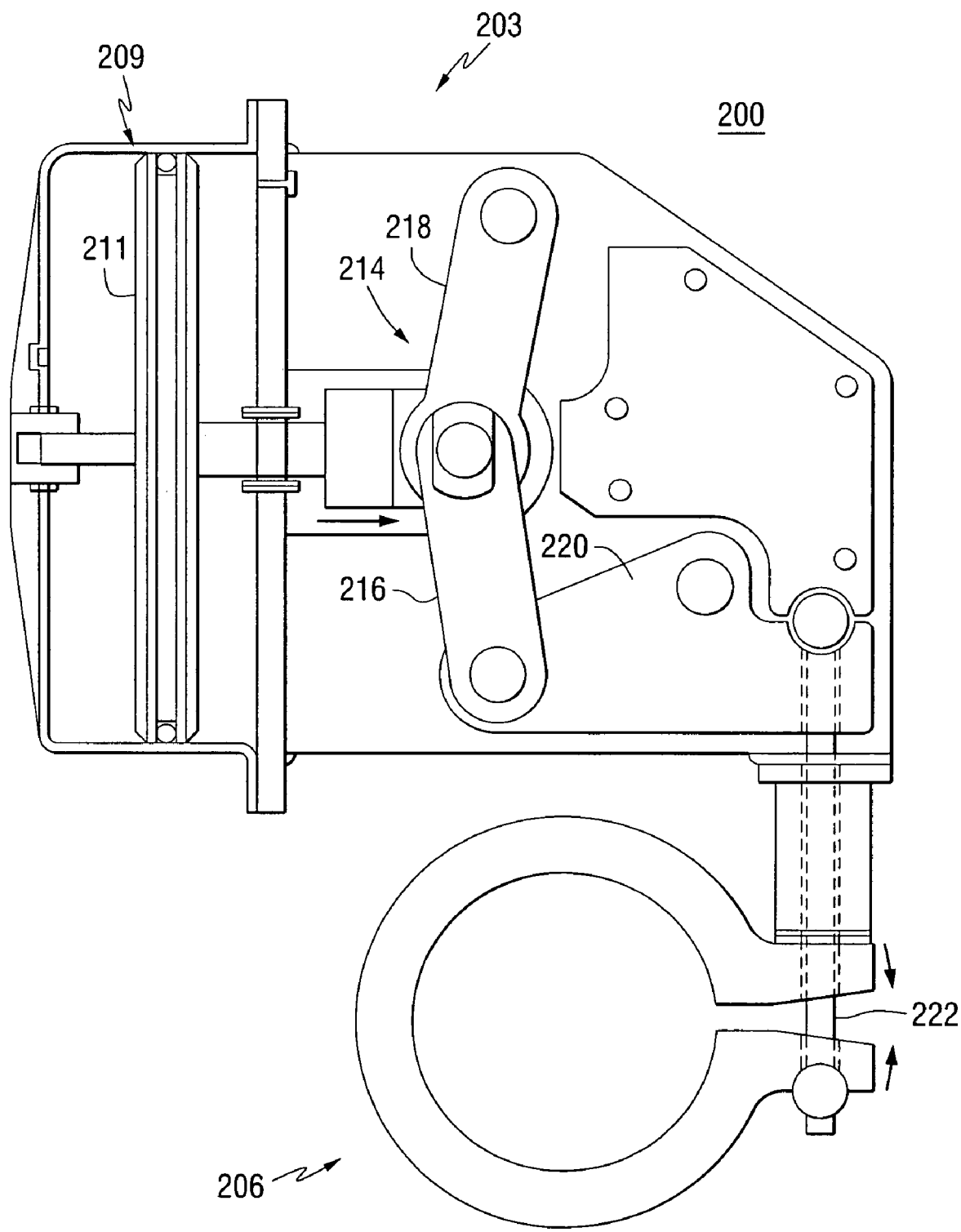
FIG. 12 is a side view of another embodiment of an automatic parking brake according to the invention.

Referring now to FIG. 12, in an alternative embodiment of a parking brake 200, similar to the embodiment of the parking brake 100 illustrated in FIGS. 4 through 11, can also employ a clamp ring 206 for gripping the piston push rod, but can employ an alternative actuator mechanism 203 for opening and closing the clamp ring 206. In this embodiment of the parking brake 200, the actuator 203 can also be a short travel pneumatic cylinder 209 enclosing a double acting piston 211 which is connected to a differently configured over-center lever arrangement 214. This lever arrangement 214 has a lower lever member 216 and an upper lever member 218 wherein one end of each of the lever members 216, 218 is pinned to each other and the end of the double acting piston 211. The opposite end of the upper lever member 218 can be pinned to a housing portion of the actuating mechanism 203, and the opposite end of the lower lever member 216 can be pinned to a link 220. The link 220 can be pinned at a central portion thereof to, for example, the housing of the actuating mechanism 203, and can have another end thereof connected to a rod 222 which opens and closes the clamp ring 206. Movement of the lever members 216 and 218 by the double acting piston 211 causes the lower lever member 216 to rotate the link 220 about the point at which it is pinned to the actuating mechanism 203, which causes the end of the link 220 to open and close the clamp ring 206 about the push rod, via the rod 222. Except for the configuration of the actuating mechanism 203 and lever arrangement 214 for opening and closing the clamp ring 206, this embodiment of the parking brake 200 can otherwise function in the same manner as the parking brake 100 described previously.

Operation

According to a preferred manner of operating the automatic parking brake 100 and/or 200, the pneumatic actuator can be pressurized on the application side with brake cylinder pressure, and on the release side with brake pipe pressure. The clamp ring could be designed to automatically grip the push rod only when brake cylinder pressure exceeds brake pipe pressure by a predetermined amount, which normally occurs only following an emergency brake application. For example, the parking brake actuator can be automatically activated by the exhaust of brake pipe and the development of full emergency brake cylinder pressure, causing the clamp ring to be tightened (and automatically locked) around the push rod, thereby holding the push rod securely in, for example, a fully applied position. In this manner, the clamp would not be actuated so long as the brake pipe remained substantially charged. Additionally, timing chokes could be employed to ensure that the clamp would not be applied until well after the brake cylinder has reached full emergency pressure. Normally, sufficient time will have elapsed to permit the train to be stopped. For example, the automatic parking brake can be designed to automatically clamp the push rod about one minute after an emergency brake application is made. In general, the intent is that whenever an emergency brake application is implemented, after a sufficient period of time has passed to stop the train, the differential pressure between brake cylinder and brake pipe will act on the opposite faces of the double acting piston and force the closure of the clamp ring about the push rod.

Effective Holding Power (NBR)

Tests on actual cars have shown that over 85% of the full emergency braking force can be reliably retained by the rigging clamp, even if the BCP is exhausted completely. By retaining in excess of 85% of the emergency braking force, the effective net braking ratio (NBR) for the parking brake will be slightly higher than the design NBR for the car, because the emergency BCP must be 15% to 20% higher than the full service pressure that the design NBR is based on. Therefore, as long as the design NBR exceeds 11%, which is the new minimum requirement for all cars, the effective NBR for the parking brake will exceed the AAR minimum requirement of 11% for conventional handbrakes.

Therefore, on new cars operated at 90 psi, the effective parking brake NBR should always exceed 11%. For retrofit applications to older cars having a lower design NBR, the parking brake would most often have an effective NBR of at least 9.5%. In the worst case, based on cars that just met the old minimum NBR requirement of 6.5% at 50 psi, the parking brake would still exceed 8.5% for a 90 psi emergency.

These lower net braking ratios on retrofits should be fully acceptable, because individual automatic parking brakes would not necessarily need to have as much holding power as the conventional handbrake. Provided all cars in a given train were equipped with the parking brake, 100% of any group of such cars would automatically be braked when parked. This far exceeds the percentage of handbrakes that typically need to be tied down. Looking at it from another perspective, an effective NBR of 8.5% would be more than sufficient to statically hold a loaded car on a 3.5% grade. Finally, in rare instances where such cars might need to be left on even steeper grades, or where operating pressures might be well below 90 psi, operating rules could still call for the use of the conventional handbrake.

It is also significant that cars are most often parked on grades of less than 1%, and on a 1% grade a 2.3% effective net braking ratio would be sufficient to hold a car. If all equipped cars in a given cut were braked at 11% or above, only 20% or one out of five of the cars would need to be equipped in order to assure holding the cut. The significance of this is simply that in a conversion program, the economic benefits could be reaped well before all cars in the given fleet were equipped.

In regard to holding power, anytime a train encounters a problem that leads to an unplanned stop on a grade, automatic parking brakes would provide a most efficient means for securing the train. It would not be necessary to walk the length of a train on an uphill grade in order to set up handbrakes on the downhill end. The automatic parking brake would also minimize the loss of braking force on individual cars that could occur due to any amount of brake cylinder pressure leakage following emergency applications, limiting such loss to 10% to 15%. In essence, the parking brake would provide an automatic mechanical backup to the pneumatic emergency brake with no time limit on the duration of its effectiveness.

Once closed, the clamp effectively locks in a very high percentage of the net shoe force generated by the full emergency brake cylinder pressure. Similar to a properly tightened conventional handbrake, this force can be retained indefinitely, even if the brake cylinder pressure completely leaks off. The automatic parking brake can also be designed to automatically release the clamp when the brake pipe pressure is restored and any remaining brake cylinder pressure is exhausted during release of the emergency application.

In a runaway situation, the parking brake can be applied as a mechanical backup to prevent a significant loss of braking force due to possible leakage. Emergency equalization pressure will not be materially affected, because the small size and short stroke of the pneumatic parking brake actuator constitutes a very small additional volume relative to the brake cylinder and the 6000 cubic inch combined reservoir. For example, in an embodiment of the invention, the pneumatic brake actuator cylinder can have a diameter of about six inches, and the piston stroke can be about 1.025 inches.

The parking brake will normally be released prior to moving cars, for example, either automatically by recharging the brake pipe, or manually by using a manual release lever. However, cars may also be moved short distances without harm without releasing the parking brake, even if they are empty. According to recent AAR net braking ratio requirements, almost all new freight cars will require an appropriate empty/load equipment. Because the parking brake force is initially derived from emergency brake cylinder pressure, it will be proportioned by the empty/load equipment when the car is empty or lightly loaded. Therefore, if such cars are dragged without releasing the parking brake, the wheels will not normally slide. Only if a car were parked loaded and then emptied could the brake holding force be sufficient to slide wheels.

Figure 13:
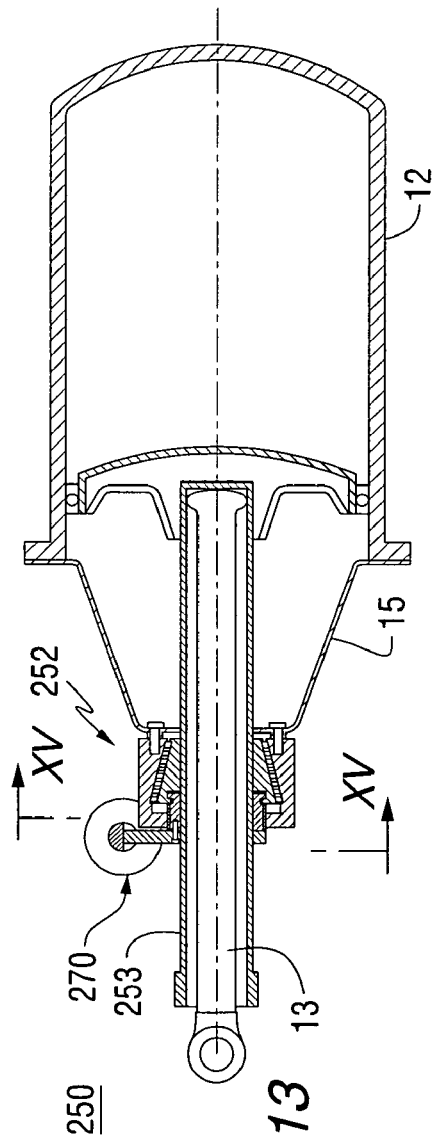
FIG. 13 is a cross-section view of a further embodiment of an automatic parking brake according to the invention.
Figure 14:
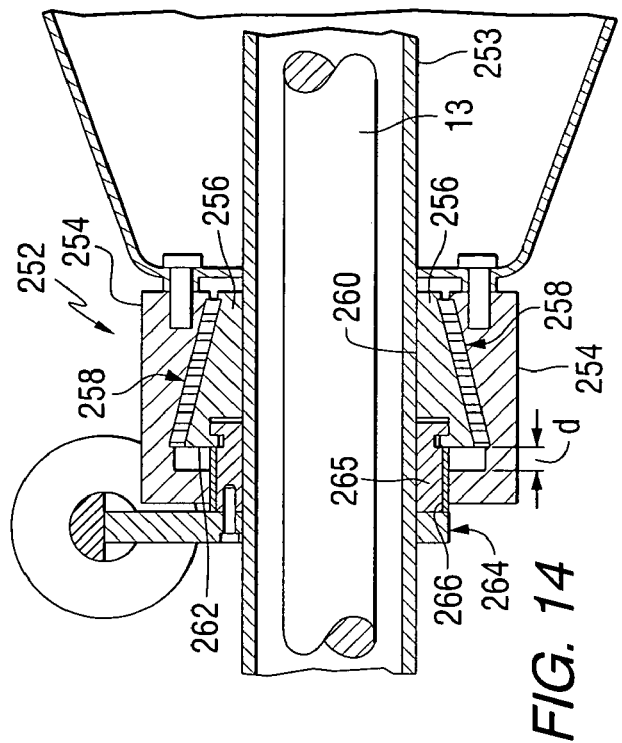
FIG. 14 is an enlarged section view of a portion of the embodiment shown in FIG. 13.
Figure 15:
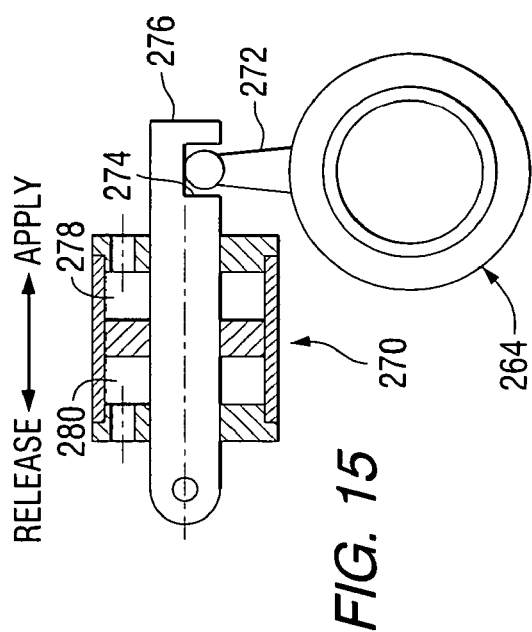
FIG. 15 is a view partially in section taken along line XV—XV in FIG. 14.

Referring now to FIGS. 13–15, a further embodiment of a blocking device 250 is shown in the form of self-actuating a collet assembly 252, which can be mounted to the brake cylinder 12 and around the push rod 13, or around a housing 253 which surrounds the push rod 13. The push rod 13 and the housing 253 move together. The collet assembly 252 can generally permit housing 253, and thus the piston push rod 13, to extend to apply the brakes on the rail vehicle, but grips the housing 253 to prevent retraction, and thus prevent a release of the brakes. The housing 253 can be engaged by the collet assembly 252 in this embodiment, which eliminates the need for the separate ratchet bar used in the previous embodiments. As shown best in FIG. 14, the collet assembly can include outer 254 and inner 256 adjacent collet jaws which permit the housing 253, and the push rod 13, to extend in a first direction, so as to apply brakes on the rail car. However, the self actuating collet jaws 254, 256 cooperate automatically grip the housing 253 and block retraction of the housing 253 and piston push rod 13 responsive to movement of the housing 253 in the opposite direction to release the brakes. As shown, for example, the outer collet jaw 254 can be mounted on the non-pressure head 15 of the brake cylinder 10 and can circumscribe, generally enclosing, the inner collet jaw 256. Needle bearings 258 can be provided between the outer 254 and inner 256 collet jaws to reduce friction therebetween so that relative movement therebetween results in primarily in the creation of normal forces between the adjacent surfaces. The inner and outer collet jaws cooperate to form a locking portion as will be described in more detail below. The inner collet jaw 256 has an inner bore 260, which can comprise a guide member in this embodiment, and has one end 262 which can be connected to a collet nut 264. The collet nut 264 can have a sleeve portion 265 with a bore coaxial with the inner bore 160 in the inner collet jaw 256. The sleeve portion 265 can extend through an opening 266 in the outer collet jaw 254. The sleeve portion of the collet nut 264 can have external threads-which engage internal threads on the opening 266 through the outer collet jaw 254, such that rotation of the collet nut 264, and thus the sleeve portion 265, results in axial movement of the collet nut 264 and thus the inner collet jaw 256. The connection between the sleeve portion 265 and the end 262 of the inner collet jaw 256 can be designed such that the inner collet jaw 256 does not rotate with the sleeve portion 265. Rather, rotation of the collet nut 264 results in axial movement of the inner collet jaw 256 along the piston push rod 13, in the direction of piston extension away from engagement with the outer collet jaw 254. This releases the housing 253 from being gripped by the collet jaws 254, 256. Sufficient space "d" can be provided within the outer collet jaw 254 for the inner collet jaw 256 to move axially away from engagement with the outer collet jaw 254, so as to provide minimal resistance between the inner bore of the inner collet jaw 256 and the piston push rod 13 to permit a release of the housing 253. Accordingly, the housing 253 and push rod 13 are permitted to extend to apply the brakes when the brake cylinder 12 is pressurized. However, if the housing 253 begins to retract, the inner collet jaw 256 is carried back, albeit for a short distance, as provided within the outer collet jaw 254, until the oppositely tapered jaws of the inner 256 and outer 254 collet jaws come into contact and block further retraction. To release the housing 253 and permit retraction of the push rod 13, the collet nut 264 can be rotated, drawing the inner collet jaw 256 axially forward, thereby releasing the engagement of the inner 256 and outer 254 tapered collet jaws. This releases the pressure on the housing 253 and permits push rod 13 to retract and the brakes to be released. In accordance with the foregoing description, movement of the inner collet jaw 256 carried by the housing 253, in a direction to release the brakes, engages and tries to expand the outer collet jaw 254, thereby creating force between the collet jaws 254, 256. Since the outer collet jaw 254 is designed to be generally rigid, this force acts on the inner collet jaw 256, which is designed to permit some compression, the result is the in creation of pressure end between the inner bore of the inner collet jaw 256 and the housing 253. This pressure creates friction between the inner bore 260 of the inner collet jaw 256 and the housing 253 which essentially stops the housing 253, and thus the piston push rod 13, from retracting any further.

Referring now to FIG. 15, a collet operating cylinder 270 can be provided for selectively rotating the collet nut 264 to grip and release the housing 253. An arm 272 extending from the collet nut 264 can be captured via a notch 274 in a linkage portion 276 associated with the operating cylinder 270. The operating cylinder 270 can be selectively operated to translate the notched linkage 276 to rotate the collet nut 264 in opposite directions to cause the collet jaws 254, 256 to engage or release the housing 253. The operating cylinder 270 can be remotely controlled to activate and deactivate the self-actuating gripping action of the collet jaws 254, 256. As illustrated, for example, the operating cylinder 270 can have internal chambers 278, 280 which can be connected to a source of pressure, such as a compressed air source, whereby pressurization of one or the other internal chambers 278, 280 causes the collet nut 264 to rotate in opposite directions to cause the collet jaws 254, 256 to release the housing 253, or to position the inner collet jaw 256 to grip the housing 253 upon retraction.

As explained previously, this blocking device 250 can be easily adapted for use with a brake cylinder on either the car or truck mounted brake systems shown in FIGS. 1–3. Irrespective of the specific design, the basic operating principle of an automatic parking brake, or blocking device, according to the invention is that whenever the pneumatic brake is applied, and perhaps more desirably after an emergency brake application, a blocking device can be implemented to prevent release of the rail vehicle brakes. This can be accomplished, as described above, by blocking the ability of the brake cylinder piston push rod, or the brake rigging, to move to a release position. The blocking device can be selectively turned on or off, or can be activated automatically by movement of the piston push rod, to block retraction of the push rod despite a loss of brake cylinder pressure. Release of the blocking device can also be implemented automatically, for example responsive to restoration of brake pipe pressure, or manually at each car via provision of a manual release rod similar to the brake cylinder release rod of existing AAR standard freight car brake equipment. However, the automatic blocking device not designed to be operated manually, such as to hold cars during switching operations without air, for example. Consequently, a conventional handbrake can still be necessary for this purpose, and for the purpose of controlling the speed of rail cars in rider humping operations, as still used in some locations to bring cars through coal tipples.

Figure 16:
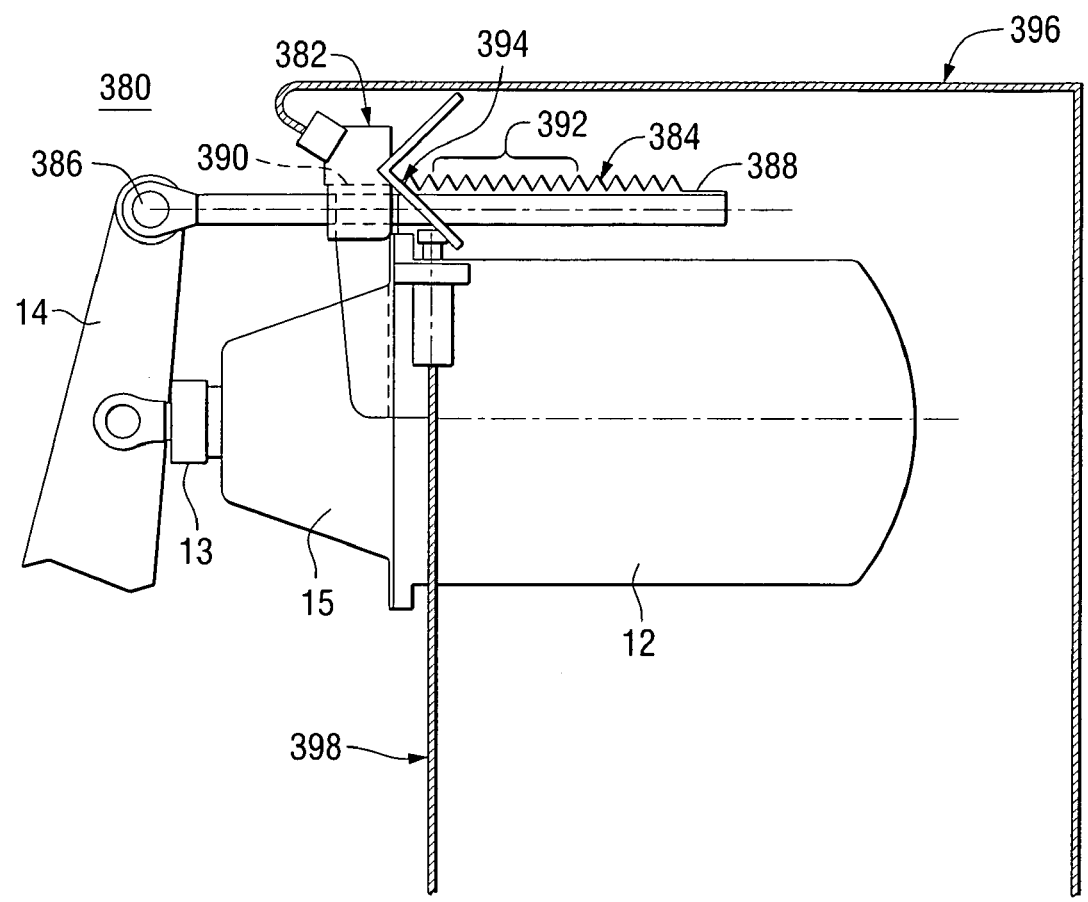
FIG. 16 illustrates a further embodiment of an automatic parking brake according to the invention.

FIG. 16 illustrates another embodiment of the invention, wherein the automatic parking brake 380, also referred to herein as a "blocking device," can be positioned on the brake cylinder 12 and connected to an extension of the cylinder force transfer lever 14 beyond the piston push rod 13, or at any point where the position of the cylinder force transfer lever 14 can be blocked. This would not include the slack adjuster 16, as it is essentially a fixed link in the brake rigging and does not necessarily change its length at all in response to brake application and release operations. For illustration purposes, the blocking device 380 is shown mounted to the non-pressure head 15 of the brake cylinder 12 of a car mounted brake system 30 shown in FIGS. 2 and 3. However, those of ordinary skill in the art will recognize that the blocking device 380 could also be similarly positioned on the brake cylinder assembly 70 (see FIG. 2) and connected to an extension provided on the cylinder force transfer lever 64 of the truck mounted brake system 30.

As illustrated, the blocking device 380 can include a sleeve or guide member, which in this case, can be part of a control box 382, that can be mounted on the non-pressure head 15 of the brake cylinder 12. A rod member, such as a ratchet bar 384, can be slidably disposed through the guide member 380. A first end 86 of the ratchet bar 384 can be connected to the brake rigging, such as the transfer lever 14 as shown, whereas a second end 388 is slidingly received through an opening 390, or guide portion, of the control box 382. A locking member can be provided which permits extension of the push rod while automatically preventing retraction subsequent to such extension. For example, the second end 388 of the ratchet bar 384 can be provided with a plurality of notches 392 extending along the length of the bar 384 for engaging a locking portion, or ratcheting member 394. In accordance with the well known functioning of ratcheting systems, the locking portion 394 can be designed to permit extension of the ratchet bar 384 in one direction, as the piston push rod 13 extends from the brake cylinder 12 during a brake application, yet prevent retraction of the ratchet bar 384 in the opposite direction, thus preventing retraction of the piston push rod 13 to release the brakes. Such ratcheting systems are well known to those of skill in the art, and the specific details of any particular type of ratcheting system are not necessary to a full and complete understanding of the invention.

It can be desirable to remotely control the release, and/or activation, of the blocking device 380. For example, as illustrated, the control box 382 can be plumbed to control, such as pneumatically, the ratcheting member 394 so as to selectively release or engage the ratchet bar 384. As explained, the ratcheting member 394 can automatically engage the ratchet bar 384 if it begins to retract, however, if it is not desired to have the ratcheting member 394 automatically engage the ratchet bar 384 on every brake application, the control box 382 can be designed to permit the blocking device 380 to be deactivated under certain conditions. For example, it may be desired that the blocking device 380 be engaged subsequent only to an emergency brake application. The control system thus can include both an application pipe 396 and a release pipe 398 for basically overriding the position of the ratcheting member 394 with respect to the ratchet bar 384.

Figure 17:
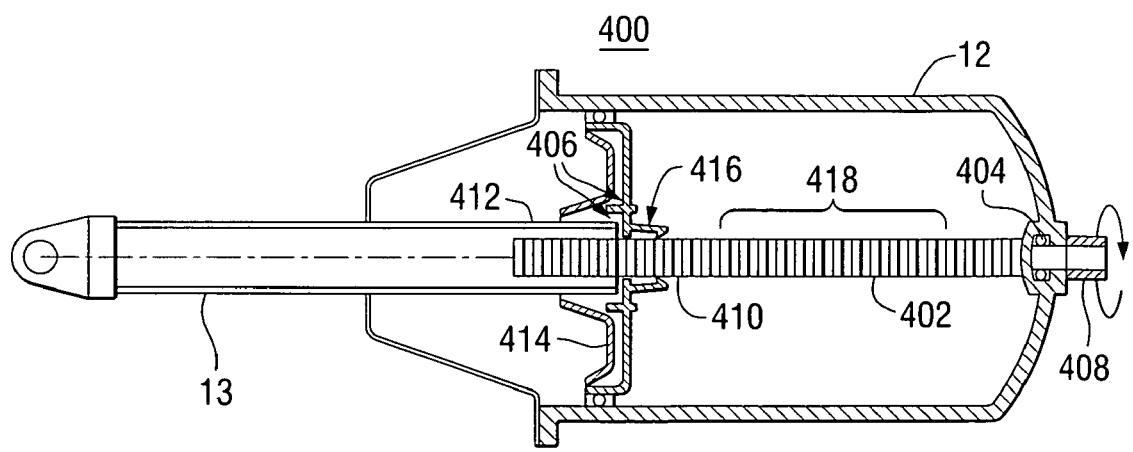
FIG. 17 is a cross-section view of a further embodiment of an automatic parking brake according to the invention.

An alternative embodiment of a blocking device 400 is illustrated in FIG. 17, wherein the blocking device 400 is configured to be positioned generally inside the brake cylinder 12, in manner a to prevent retraction of the piston push rod 13. Like the blocking device 380 in FIG. 16, this blocking device 400 can also be adapted to work in combination with a brake cylinder on either the car or truck mounted brake systems shown in FIGS. 1–3. As shown, the blocking device 400 can also employ a rod, or ratchet bar 402, which can be disposed within the brake cylinder 12. In this embodiment, the guide member can be a hollow portion of, or associated therewith, the piston push rod 13, or could comprise part of the opening through the piston face 414. Since the ratchet bar 402 is within the pressure head of the brake cylinder, appropriate sealing members 404, 406 can be employed to prevent loss of pressure both at the end 408 of the ratchet bar 402 which projects from the pressure head of the brake cylinder 12, and at the end 410 of the ratchet bar 402 which passes through the piston face 414 into the end 412 of the push rod 13. At least the end 412 of the push rod 13 can be hollow so that the ratchet bar 402 can remain axially located with respect to the push rod 13. When the push rod 13 is extended to apply the brakes on the rail vehicle, the ratchet bar 402 can be automatically engaged by a ratcheting member, or locking portion 416, positioned adjacent the piston face 414. Thus, the piston, and the push rod 13, are prevented from retracting to release the brakes.

In this type of blocking device 400, disposed within the pressure head of the brake cylinder 12, one way to selectively control the engagement of the ratchet bar 402 by the locking member 416 is, as shown in FIG. 5, for example, to provide notches 418 on only a portion of the surface of the ratchet bar 402. The locking portion 416 can then be configured such that the notches 418 on the ratchet bar 402 can only be engaged if the ratchet bar 402 is rotated to a certain position. In this way, the locking portion 416 can be engaged and disengaged from the ratchet bar 402 by simply rotating the ratchet bar 402. Various types of control members can be designed to selectively rotate the ratchet bar 402 via the end 408 thereof which extends externally of the brake cylinder 12. The ratchet bar 402 can thus be configured with the notches 418 radially spaced about the circumference of the bar 402, such that varying degrees of rotation of the ratchet bar 402 can engage and disengage the locking member 416. The locking portion 416 can correspondingly be designed, and positioned, such that it the notches 418 be engaged unless the ratchet bar 402 is rotated to a position that brings the notches 418 into engagement with the locking member 416. For example, a 2, 4 or 6 sided rack would rotate into and out of engagement with the locking member 416 every 90, 45, or 30 degrees, respectively.

Any of the automatic parking brake embodiments described herein can be operated to apply the brakes on all cars in a train essentially simultaneously. This is a great improvement in the ability of the parking brake to hold a train on a grade without a locomotive, bringing about improved safety in operations. Likewise the elimination of the necessity for crewmen to apply handbrakes on cars when they are set out, or release them when cars are picked up, would both speed operations and reduce the number of wheels damaged by dragging handbrakes. If applied in a service where electrically controlled brakes were used, a further refinement can be to provide for a release of the automatic parking brake independent of brake pipe restoration. This can be done to permit charging of trainlines while safely holding the cars in the train. Furthermore, since the high force and energy necessary to apply the parking brake is provided by equipment that is already part of the car, the cost of a simple holding mechanism could be minimal, which would encourage the widespread adoption of such blocking devices.

Assuming that the blocking device was located either on or beyond the centerline of the brake cylinder, the maximum force that would be likely imposed would be slightly less than the emergency brake cylinder force from a 90 pounds-per-square inch ("psi") brake pipe fully charged system. Ignoring release spring and seal friction, which would reduce the amount to be held thus giving some conservatism to this calculation, this force, for a 10 inch brake cylinder, would be 6005.25 pounds.

As air pressure in the brake cylinder is reduced after an emergency application, the piston will begin to withdraw, and load will be imposed on the blocking device. This is true even where the blocking device is a collet as shown in FIGS. 13–15, gripping the piston push rod in the non-pressure head of the convention brake cylinder. In such a case, the metal of the non-pressure head, and the collet's axial supporting parts would be loaded, with attendant axial deflection, moving the piston toward release, though likely not very far in such a case. The actual force held will be less than the maximum by the amount of the piston push rod withdrawal multiplied by the spring rate of the rigging. For a conventional rigging, this spring rate, at the push rod, is on the order of 1000 pounds per inch. Thus, if the piston relaxed by a quarter of an inch, the effective piston force for calculation of parking brake effectiveness would be 6000−(1000×0.25) =5750 pounds.

With the amount of relaxation known for a particular design, and a reliable minimum rigging spring rate, parking brake effectiveness can be calculated. For example, using the following assumptions: a relaxation of ¼ inch, a spring rate 1000 pounds per inch, brake cylinder pressure of 63.73 psi (service equalization from 90 psi), and a 10 percent actual braking ratio at that pressure would result in a theoretical piston force of 63.73×0.785×100, i.e., 5002.8 pounds. Piston force held after relaxation from an emergency application would be, for example, 5750 pounds. Thus, expected parking brake effectiveness would be 5750/5002×10%=11.49%. From this, it would appear that a blocked rigging parking brake has the potential to be practical. Net braking ratios of more than 10 percent are under discussion and would provide more leeway for the practicality of the blocked rigging parking brake.

Figure 18:
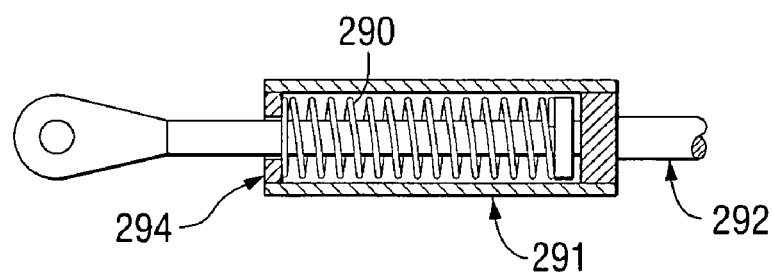
FIG. 18 is a section view of an embodiment of a resiliently compressible member utilized according to the invention to soften the brake rigging.
Figure 19:
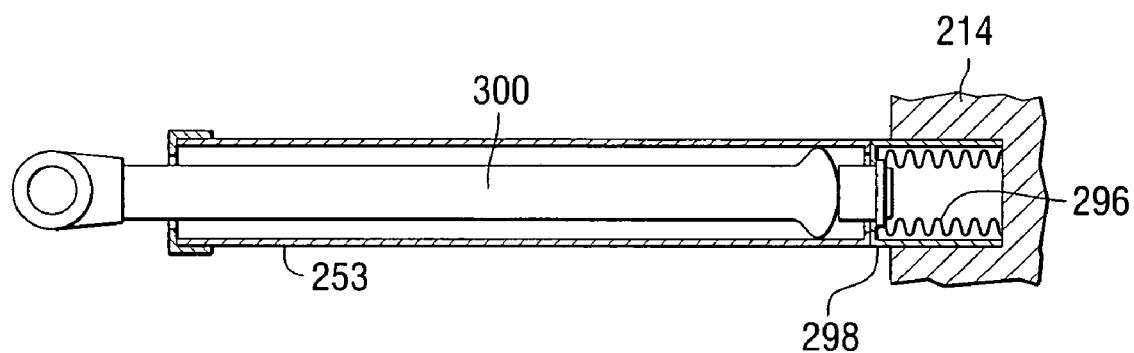
FIG. 19 is a section view of another embodiment of a resiliently compressible member utilized according to the invention to soften the brake rigging.

In the event that brake rigging stiffness was higher than above, or relaxation greater, it could be desirable to soften the rigging near the maximum load with a preloaded high rate spring provided in the brake system. Examples of different embodiments of resiliently compressed members, such as preload springs, which can be appropriately positioned in the rail vehicle brake system are illustrated in FIGS. 18 and 19. The preloading spring can be, for example, formed from a stack of Belleville washers. FIG. 18 shows the spring 290 carried in a fitting 291, which can be welded to the slack adjuster tail rod 292. In the case of a clamp or collet type embodiment, the spring 296 could be carried in a hollow base portion 298 associated with or connected to the hollow rod 253, using a shortened push rod 300, as shown in FIG. 19.

Pneumatic control of an automatic parking brake as described herein can be designed to function, for example, as outlined in Table 1 below:

Although certain embodiments of the invention have been described in detail hereinabove, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A parking brake for a railway vehicle brake system, said rail vehicle brake system including a brake cylinder having a push rod connected to brake rigging wherein pressurization of said brake cylinder moves said push rod in a first direction to cause said brake rigging to apply brakes on said rail vehicle, said parking brake comprising:
   a. a split ring clamp with first and second opposing ends thereof, defining an open state corresponding to a greater distance between said first and second opposing ends, and a locked state corresponding to a lesser distance between said first and second opposing ends, said clamp encircling at least a portion of said push rod;
   c. a compression member having a lower end rotatably associated with said first opposing end of said split ring clamp member and an upper end connected to an actuator;
   d. a tension member positioned parallel with said compression member, said tension member having a length greater than said compression member, said tension member having a lower end rotatably associated with said second opposing end of said split ring clamp and an upper end connect to said actuator; and
   e. a lever arrangement connected between said split ring clamp and said actuator, said lever arrangement connected to each of said first and second opposing ends, said actuator causing said lever arrangement to move said split ring clamp between said open and locked

TABLE 1

| PNEUMATIC OPERATIONS | |
| --- | --- |
| CONDITION | ACTION REQUIRED |
| Release and charging. | release the parking brake when brake pipe pressure exceeds a predetermined pressure, for example, 50 psi, and charge an actuating reservoir if provided. |
| Service, including all service brake related functions, (initial service, full service, lap, Q.S., service accelerated release, etc.). | Parking brake should have no effect on rigging operation, and remains released. |
| Emergency | Parking brake should lock the push rod at maximum rigging travel automatically, or approx one minute after application, and should require no air pressure to maintain this condition. |
| Handbrake Application | Parking brake, if applied, should not interfere with increase of brake effort caused by handbrake. Parking brake, if released, should not interfere with handbrake application, nor be activated by thereby. |
| Handbrake Release | Parking brake, if applied, should not release with handbrake. Parking brake, if released should not interfere with full release of handbrake. |
| Manual Parking brake release | Should release parking brake and reset pneumatic actuator to release and charging condition. |
| Emergency Release | Identical to Release and charging | states by varying the distance between said first and second opposing ends; and f. a pneumatic cylinder enclosing a double acting piston, and said double acting piston having a rod end connected to said lever arrangement for moving said split ring clamp between said open and locked states responsive to pressure in said pneumatic cylinder, g. wherein movement of said upper end of each of said parallel compression and tension members results in rotation thereof about said lower ends thereof to cause said first and second opposing ends of said split ring clamp to move between said open state and said locked state, respectively, depending upon a direction of said rotation.

2. The parking brake of claim 1 further comprising a latch release mechanism intermediate said rod ends and said lever arrangement, said latch release mechanism operable to cause said lever arrangement to move said clamp ring to said open state.

3. The parking brake of claim 2 further comprising a manual release lever connected to said latch release mechanism such that operation of said manual release lever operates said latch release mechanism to cause said lever arrangement to move said clamp ring to said open state.

4. A parking brake for a railway vehicle brake system, said rail vehicle brake system including a brake cylinder having a push rod connected to brake rigging wherein pressurization of said brake cylinder moves said push rod in a first direction to cause said brake rigging to apply brakes on said rail vehicle, said parking brake comprising:

a. a split ring clamp member having first and second opposing ends, said clamp member encircling at least a portion of said push rod which projects from said brake cylinder, said clamp member having an open state corresponding to a greater distance between said first and second opposing ends, in which said push rod slides freely, and a locked state corresponding to a lesser distance between said first and second opposing ends, in which movement of said push rod is prevented;

b. an actuator operably associated with said clamp for moving said clamp between said open and locked states;

c. a lever arrangement connected between said split ring clamp and said actuator, said lever arrangement connected to each of said first and second opposing ends;

d. said actuator causing said lever arrangement to move said split ring clamp between said open and locked states by varying the distance between said first and second opposing ends;

e. a compression member having a lower end rotatably associated with said first opposing end of said split ring clamp and an upper end connect to said actuator; and f. a tension member positioned parallel with said compression member, said tension member having a length greater than said compression member, said tension member having a lower end rotatably associated with said second opposing end of said split ring clamp and an upper end connect to said actuator;

g. wherein movement of said upper end of each of said parallel compression and tension members results in rotation thereof about said lower ends thereof to cause said first and second opposing ends of said split ring clamp to move between said open and locked states, respectively, depending upon a direction of said rotation.

5. The parking brake of claim 4 further comprising an over-travel stop member limiting said rotation of said parallel compression and tension members.

6. The parking brake of claim 4 further comprising an anti-rotation pin limiting said rotation of said parallel compression and tension members.

* * * * *